(12) United States Patent
Mertz et al.

(10) Patent No.: US 7,211,140 B1
(45) Date of Patent: May 1, 2007

(54) LOW TEMPERATURE PLASTICIZERS FOR FLEXIBLE POLYVINYL CHLORIDE RESIN APPLICATIONS

(75) Inventors: William J. Mertz, West Harrison, IN (US); Jeffrey A. Gates, West Chester, OH (US)

(73) Assignee: Cognis Corporation, Cincinnati, OH (US)

( * ) Notice: Subject to any disclaimer, the term of this patent is extended or adjusted under 35 U.S.C. 154(b) by 58 days.

(21) Appl. No.: 10/315,574

(22) Filed: Dec. 9, 2002

Related U.S. Application Data

(60) Provisional application No. 60/341,158, filed on Dec. 14, 2001.

(51) Int. Cl.
*C11C 3/04* (2006.01)
*C07C 69/52* (2006.01)
*C08K 5/101* (2006.01)
*C08L 27/00* (2006.01)

(52) U.S. Cl. ............... 106/504; 560/190; 524/306; 524/314; 524/569

(58) Field of Classification Search ............... 560/201, 560/190; 523/322; 524/569, 306, 314; 156/327, 156/332; 106/504
See application file for complete search history.

(56) References Cited

U.S. PATENT DOCUMENTS

| | | | | |
|---|---|---|---|---|
| 2,870,200 A | * | 1/1959 | Kharasch et al. | 560/190 |
| 3,562,314 A | * | 2/1971 | Shryne | 560/201 |
| 5,254,466 A | | 10/1993 | Picataggio et al. | 435/142 |
| 6,395,810 B1 | | 5/2002 | Luitjes et al. | 524/109 |

* cited by examiner

*Primary Examiner*—Taylor Victor Oh
(74) *Attorney, Agent, or Firm*—John F. Daniels; Daniel S. Ortiz

(57) ABSTRACT

Aliphatic diesters of unsaturated aliphatic $C_{10-30}$ dicarboxylic acids are low temperature plasticizers for PVC. PVC is plasticized by contacting it with a plasticizing effective amount of an aliphatic diester of an unsaturated aliphatic $C_{10-30}$ dicarboxylic acid wherein the aliphatic portion of the diester is a saturated or unsaturated, linear or branched, cyclic or acyclic unsubstituted or hydroxy-substituted aliphatic radical having from one to 10 carbon atoms.

7 Claims, No Drawings

LOW TEMPERATURE PLASTICIZERS FOR FLEXIBLE POLYVINYL CHLORIDE RESIN APPLICATIONS

CROSS-REFERENCE TO RELATED APPLICATIONS

This application claims the benefit of copending provisional application Ser. No. 60/341,158, filed on Dec. 14, 2001, the entire contents of which are incorporated herein by reference.

BACKGROUND OF THE INVENTION

Aliphatic dicarboxylic acid diesters have been used as low temperature plasticizers for polyvinyl chloride (PVC). Such diesters include the di-2-ethylhexyl esters of adipic, azelaic, and sebacic acids. However, there is a continuing need for new plasticizers for PVC which impart low temperature flexibility to PVC such as for vinyl cable insulation and vinyl tubing applications.

BRIEF SUMMARY OF THE INVENTION

The present invention relates to the use of aliphatic diesters of unsaturated aliphatic $C_{10-30}$ dicarboxylic acids as low temperature plasticizers for PVC. One aspect of the present invention pertains to a method for plasticizing PVC comprising contacting PVC with a plasticizing effective amount of an aliphatic diester of an unsaturated aliphatic $C_{10-30}$ dicarboxylic acid wherein the aliphatic portion of the diester is a saturated or unsaturated, linear or branched, cyclic or acyclic unsubstituted or hydroxy-substituted aliphatic radical having from one to 10 carbon atoms.

Another aspect of the present invention pertains to plasticized PVC comprised of PVC and a plasticizing effective amount of an aliphatic diester of an unsaturated aliphatic $C_{10-30}$ dicarboxylic acid wherein the aliphatic portion of the diester is a saturated or unsaturated, linear or branched, cyclic or acyclic unsubstituted or hydroxy-substituted aliphatic radical having from one to 10 carbon atoms.

BRIEF DESCRIPTION OF THE SEVERAL VIEWS OF THE DRAWINGS

Not applicable.

DETAILED DESCRIPTION OF THE INVENTION

The aliphatic portion of the diesters of the unsaturated aliphatic $C_{10-30}$ dicarboxylic acids according to the invention can be derived from any saturated or unsaturated, linear or branched, cyclic or acyclic aliphatic alcohol or diol having from one to 10 carbon atoms such as, for example, methanol, butanol, decanol, a buteneol, cyclohexanol, 1,4-butanediol and the like. The acid portion of the aliphatic diesters of unsaturated aliphatic $C_{10-30}$ dicarboxylic acids according to the invention can be any unsaturated dicarboxylic acid having from 10 to 30 carbon atoms. Examples of such unsaturated dicarboxylic acids include, but are not limited to, 4-decenedioic acid, 9-decenedioic acid, 4-dodecenedioic acid, 9-dodecenedioic acid, 4-tetradecenedioic acid, 5-tetradecenedioic acid, 9-tetradecenedioic acid, 9-octadecenedioic acid, 9-eicosenedioic acid and the like. The unsaturated dicarboxylic acids according to the invention can be made by biooxidation of the corresponding mono-carboxylic acid, an ester of the corresponding monocarboxylic acid or a linear alkene having the same number of carbon atoms as the dicarboxylic acid. For example, 9-octadecenedioic acid can be made by the biooxidation of oleic acid, methyl oleate or 9-octadecene as described in U.S. Pat. No. 5,254,466, the entire contents of which are incorporated herein by reference. The preferred diester according to the invention is the dimethyl ester of 9-octadecenedioic acid (dimethyl 9-octadecenedioate).

The diesters according to the invention can be made by any esterification method well known to those skilled in the art such as, for example, direct esterification of an unsaturated dicarboxylic acid with an alcohol, the reaction of the diacid chloride of an unsaturated dicarboxylic acid with an alcohol, and the like.

The amount of diester incorporated into PVC is an effective amount which is any amount required to effect plasticization of PVC for a particular application. The effective amount for any given application will be readily discernable by one of ordinary skill in the art. The diesters according to the invention can be incorporated into PVC resin by methods known to those skilled in the art such as in Example 2 below.

The following examples are meant to illustrate but not to limit the invention.

Example 1

The dimethyl ester of octadec-9-enedioic acid was prepared by esterifying the acid with methanol. A starting proportion of about from 83% octadec-9-enedioic acid, 17% methanol to 75% diacid, 25% methanol (depending on the amount of methanol used in excess of the stoichiometric value needed) was added to an esterifier pot equipped with a heating mantel, therm-o-watch temperature controller, thermocouple, subsurface addition funnel, mechanical stirrer, distillation take-off equipment and a receiver. A strong acid catalyst such as para-toluenesulfonic acid can be used at a level of about 0.2 to 0.5% of the charge. Subsurface addition of excess methanol was used during the reaction. The temperature of the reaction mixture was gradually increased to about 80° C. Methanol plus the water of esterification was taken off at a vapor temperature of about 73 to 77° C. The pot temperature was gradually raised as the diester was formed in the pot, to about 150° C. The reaction was monitored by determining the acid value of the pot contents. When the AV was about 3 or lower, the AV was neutralized by the addition of a stoichometric amount of methanolic KOH solution. The pot contents are then distilled by applying high vacuum to the pot (less than 1 Torr pressure), and heating to approximately 160–170° C. A 5 to 10% top-cut was taken before collecting the final distillate to remove any excess methanol still remaining in the pot. The final diester had an AV and OH.V. <1.0 mgKOH/g.

Example 2

Forty-five to fifty grams of the diester from Example 1 were then weighed into 100 grams of a standard general-purpose PVC resin, such as Geon 30 PVC resin. Two grams of a powdered PVC heat stabilizer, such as Ferro-1820, and one gram of a liquid heat stabilizer, such as Ferro-904 are also added to the mix. The entire mixture was then processed on a steam-heated two-roll rubber mill. The roll temperatures are from about 300° F. to 350° F. A soft vinyl film was formed, and allowed to mill at these temperatures for five minutes after fusion of the PVC resin. After cooling to room temperature, portions of the sheet are cut into smaller pieces and compression molded into 75 and 20-mil thick plaques using an electrically heated compression molder heated to from about 300 to 345° C., and subjected to about 2000 psi. Physical properties are determined on each 75-mil thick sample using an Instron Universal tester. Brittle points are determined on 75-mil thick samples using the ASTM D-746 procedure. Roll spew compatibilities are determined by rolling a 1.5-inch strip of the 75-mil sample around a 0.25-inch mandrel, and conditioning for five hours at room temperature. After five hours, the strip was unrolled, and visually checked for evidence of spew. Wet extractions are performed on two-inch diameter circles of the 20-mil films, using soapy water (1% IVORY® flakes) for one day at 50° C., and mineral oil for one day at room temperature. Carbon volatilities are run by burying each 20-mil circle in a layer of activated carbon and aging for one day at 70° C. All wet extractions and carbon volatilities are expressed as % weight loss.

Example 3

A flexible PVC film was prepared by milling forty-five parts per hundred resin (PHR) of dimethyloctadec-9-enedioate into a flexible vinyl formulation. The resulting vinyl film exhibited physical properties that indicated that the plasticizer was more efficient at plasticizing the resin than a standard control plasticizer, di-(2-ethylhexyl) azelate (DOZ). The 100% modulus was 981 psi for the dimethyloctadec-9-enedioate plasticizer versus 1270 psi for the control plasticizer. Also, the low temperature properties were significantly improved over the control plasticizer, as measured by the ASTM D-746 method. The brittle point was −57.5° C. for the dimethyloctadec-9-enedioate versus −52.5° C. for the control plasticizer.

Table I is a summary of the vinyl evaluation of a few dimethyl esters according to the invention, versus DOZ and some other related compounds. 1,4-BD is the 1,4-butanediol ester of 9-octadecenedioic acid, dimethyl is the dimethyl ester of 9-octadecenedioic acid, and dibutyl is the dibutyl ester of 9-octadecenedioic acid.

TABLE I

Vinyl Evaluation of C18:1 Diester Plasticizers vs. DOZ

| Plasticizer Type: | 1,4-BD C18:1 | Dimethyl C18:1 | Dibutyl C18:1 | DOZ |
|---|---|---|---|---|
| Mill No.: | 9814 | 9815 | 816 | 9817 |
| Formulation, PHR: | | | | |
| Geon 30 PVC Resin | 100 | 100 | 100 | 100 |
| Ferro-1820 Stab. | 2 | 2 | 2 | 2 |
| Ferro 904 Stab. | 1 | 1 | 1 | 1 |
| 3800-85/93 Plasticizer | 50 | — | — | — |
| 3746-32-2 Plasticizer | — | 45 | — | — |
| 3800-96 Plasticizer | — | — | 45 | — |
| E-9058 DOZ Plasticizer | — | — | — | 45 |
| Fused: | No | Yes | Yes | Yes |
| Physical Properties: | | | | |
| % Elongation | — | 375 | 371 | 323 |
| 100% Modulus, psi | — | 981 | 1238 | 1270 |
| Tensile, psi | — | 2851 | 3017 | 2624 |
| Roll Spew Compatibility: | — | None | Moderate | Slight |
| Brittle Point, C.: | — | −57.5 | −58.5 | −52.5 |
| Extractions, % Wt. Loss: | | | | |
| Soapy Water, 1 day @ 50 C. | — | 11.75 | 6.1 | 1.07 |
| Mineral Oil, 1 day @ 25 C. | — | 4.99 | 7.4 | 8.27 |
| Volatility, % Wt. Loss: | | | | |
| 1 day @ 70 C. | — | 4.17 | 2.76 | 1.7 |

What is claimed is:

1. A method for plasticizing PVC comprising:
   (1) forming a mixture of PVC with a plasticizing effective amount of an aliphatic diester of a mono-unsaturated aliphatic $C_{10-30}$ dicarboxylic acid wherein an aliphatic alcohol residue portion of the diester is a saturated or unsaturated, linear or branched, cyclic or acyclic unsubstituted or hydroxy-substituted aliphatic group having from on to 10 carbon atoms; and
   (2) fusing the mixture, whereby, plasticized PVC is formed.

2. The method of claim 1 wherein the unsaturated aliphatic $C_{10-30}$ dicarboxylic acid is 9-octadecenedioic acid.

3. The method of claim 1 wherein the diester is dimethyl 9-octadecenedioate.

4. A plasticized PVC composition comprised of PVC and a plasticizing effective amount of an aliphatic diester of a mono-unsaturated aliphatic $C_{10-30}$ dicarboxylic acid wherein an aliphatic alcohol residue portion of the diester is a saturated or unsaturated, linear or branched, cyclic or acyclic unsubstituted or hydroxy-substituted aliphatic group having from one to 10 carbon atoms.

5. The composition of claim 4 wherein the unsaturated aliphatic $C_{10-30}$ dicarboxylic acid is 9-octadecenedioic acid.

6. The composition of claim 4 wherein the diester is dimethyl 9-octadecenedioate.

7. The process of claim 1 wherein the mixture of PVC and the plasticizer is heated to a temperature in a range of 300° F. to 350° F. to fuse the mixture.

* * * * *